Sept. 7, 1937.  J. W. HAMBLIN  2,092,698
POWER TRANSMISSION APPARATUS
Filed Feb. 2, 1935  4 Sheets-Sheet 2
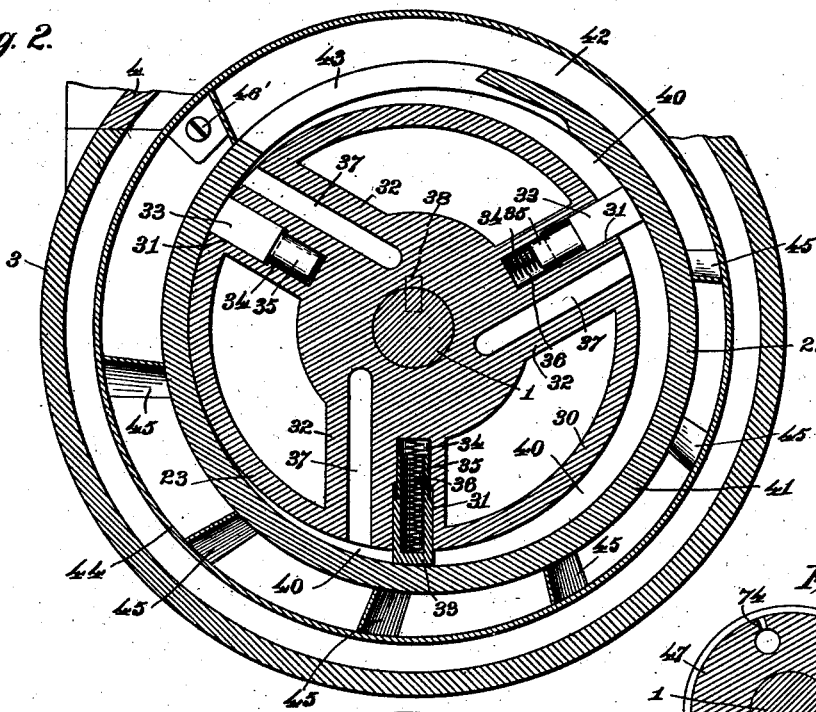
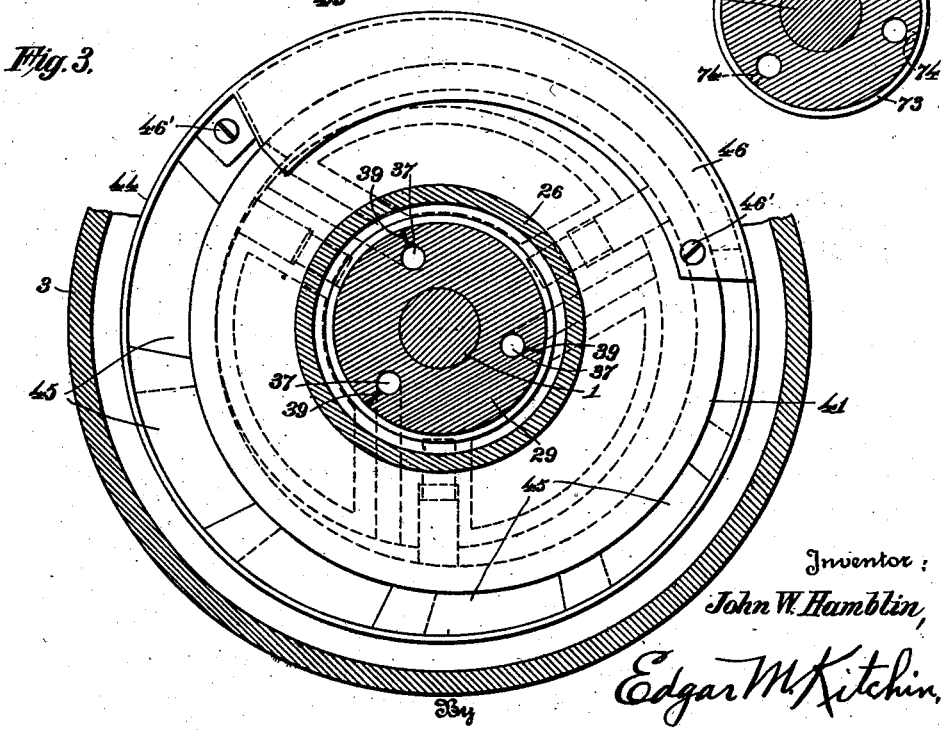

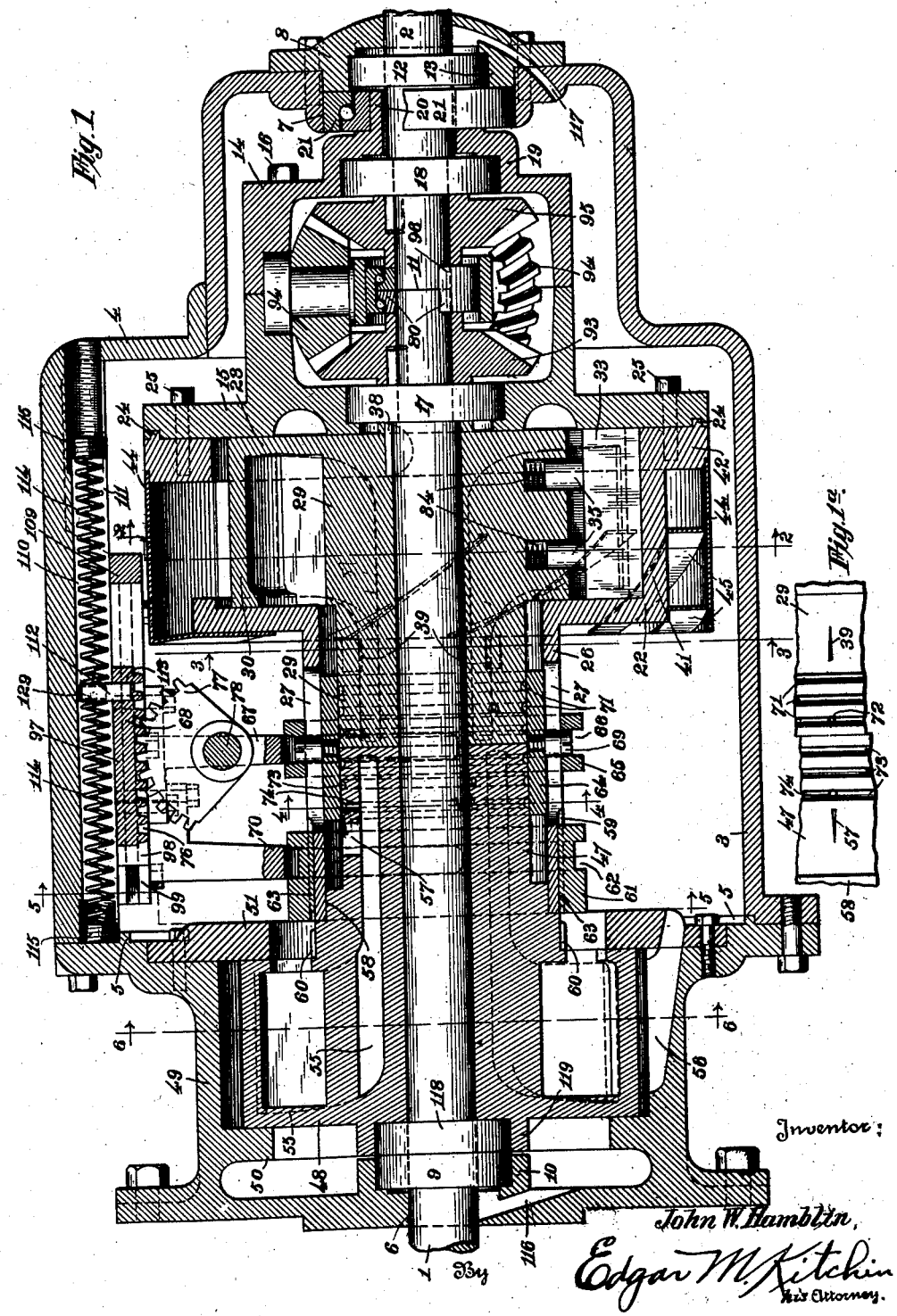

Sept. 7, 1937.   J. W. HAMBLIN   2,092,698
POWER TRANSMISSION APPARATUS
Filed Feb. 2, 1935   4 Sheets-Sheet 3
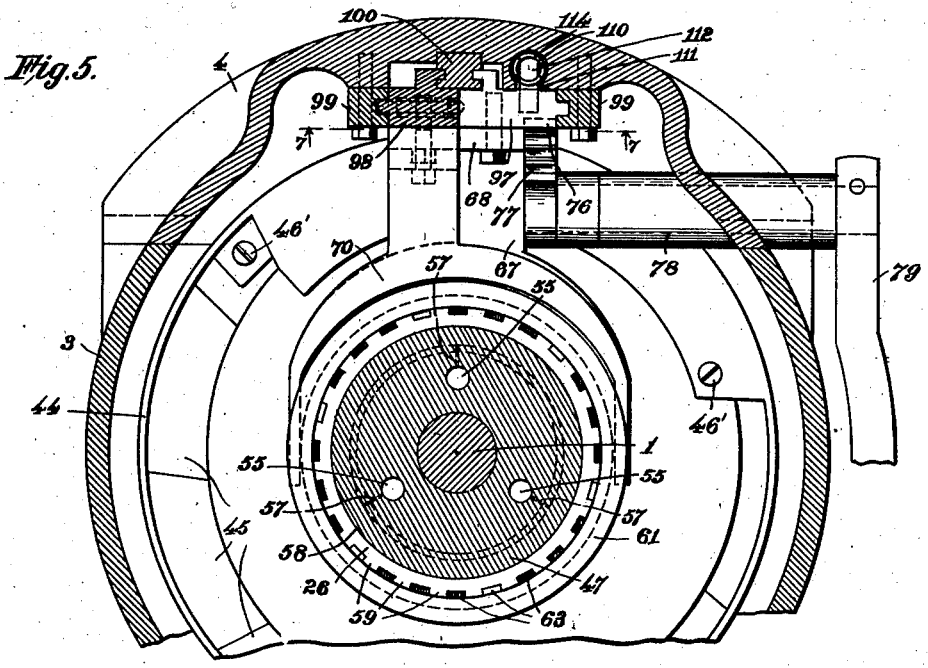
Fig. 5.
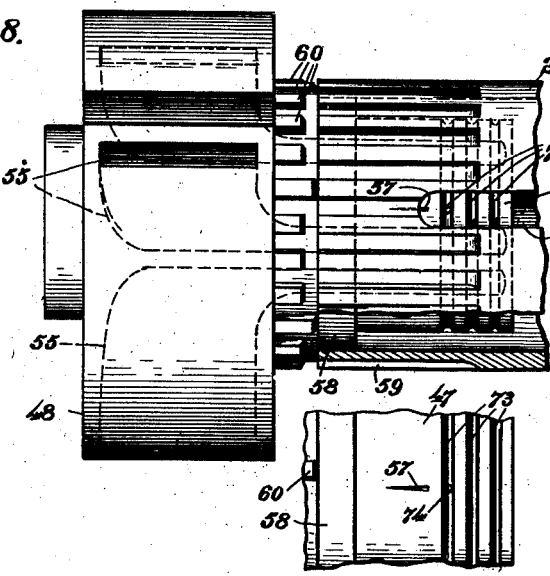
Fig. 8.
Fig. 10.
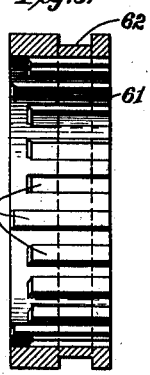
Fig. 9.
Inventor:
John W. Hamblin.
By Edgar M. Kitchin,
his Attorney.

Sept. 7, 1937.  J. W. HAMBLIN  2,092,698
POWER TRANSMISSION APPARATUS
Filed Feb. 2, 1935   4 Sheets-Sheet 4

Inventor:
John W. Hamblin,
Edgar M. Kitchin
By
his Attorney.

Patented Sept. 7, 1937

2,092,698

UNITED STATES PATENT OFFICE 2,092,698

POWER TRANSMISSION APPARATUS

John W. Hamblin, Lima, Pa.

Application February 2, 1935, Serial No. 4,709

11 Claims. (Cl. 192—4)

This invention relates to improvements in hydraulic transmission apparatus, and more particularly to improvements in that type of apparatus disclosed in my co-pending application for Letters Patent Serial No. 737,439, filed July 28, 1934.

Among the objects in view is the improvement of the refinement of control in the precision with which power is transmitted at varying speeds.

A further object in view is the control of hydraulic power transmission with means safeguarded against unbalanced stresses whereby binding and consequent frictional resistance to movement of parts is obviated.

Another object in view is the ready, full, and ample supply of transmission fluid to the transmission elements under all working conditions.

A still further object in view is the simplification in construction of parts utilized for power transmission, and a still further object is the achieving of the several advantages of the invention of my said co-pending application in an improved manner.

With these and further objects in view as will in part hereinafter become apparent and in part be stated, the invention includes apparatus for hydraulic power transmission having means for controlling variation in speed of transmission providing for exactness in such variation in speed such as to insure uniform delivery of power at any predetermined speed without likelihood or danger of any sudden modification thereof tending toward shock or jar.

In greater detail, the invention includes a power-receiving rotor, a power deliverer from the rotor adapted to be connected therewith by hydraulic means for the transmission of power, and controlled means of escape for such hydraulic means from between the rotor and power deliverer, the said controlled means being graduated to vary such escape proportional to the power to be delivered.

The invention still further includes such an arrangement of parts wherein the controlled means of escape comprises a tapering port or exit and a valve for moving along the taper to gradually close the same.

The invention also comprises such a rotor and power deliverer coordinating with a similar rotor, and hydraulic means for braking the movement of the second rotor, and means surrounding a portion of each of the rotors and shiftable toward the one and toward the other for controlling the power transmitted by the former and the braking action on the latter.

The invention still further includes the last-mentioned arrangement with means to prevent unbalanced stress on said surrounding means.

The invention also comprises the art of power transmission including the step of relieving transmission stress on hydraulic medium by releasing a relatively thin sheet thereof, and also the further step of varying the width of such sheet.

The invention still further comprises certain other novel constructions, combinations, and arrangements of parts and the art of power transmission, all as hereinafter specified and claimed.

In the accompanying drawings,—

Figure 1 is a longitudinal, vertical, central section through an apparatus embodying the features of the present invention, parts being seen in elevation.

Figure 1a is a detailed, fragmentary elevation of the abutting hub portions showing one port outlet for each hub.

Figure 2 is a transverse, vertical section approximately on the plane indicated by line 2—2 of Figure 1, and looking in the direction indicated by the arrow, parts being seen in elevation.

Figure 3 is a similar view taken on the plane indicated by line 3—3 of Figure 1 and looking in the direction indicated by the arrow, parts being seen in elevation.

Figure 4 is also a transverse, vertical section taken on the plane indicated by line 4—4 of Figure 1 and looking in the direction indicated by the arrow.

Figure 5 is a view similar to Figure 2 taken on the plane indicated by line 5—5 of Figure 1, parts being broken away for the saving of space, and parts being seen in elevation.

Figure 8 is a view in side elevation of the reverse power transmission rotor and the sleeve of the main or forward power transmission rotor, the clutch sleeve being omitted, parts being broken away for the saving of space, the lower part of the sleeve being seen in longitudinal section and the vane being omitted.

Figure 9 is a longitudinal, axial section through the clutch sleeve that is omitted from Figure 8.

Figure 10 is a fragmentary, side elevation of a part of the hub portion of the reverse power transmission rotor as seen in Figure 8 showing one of the port terminals or control exits.

Figure 6:
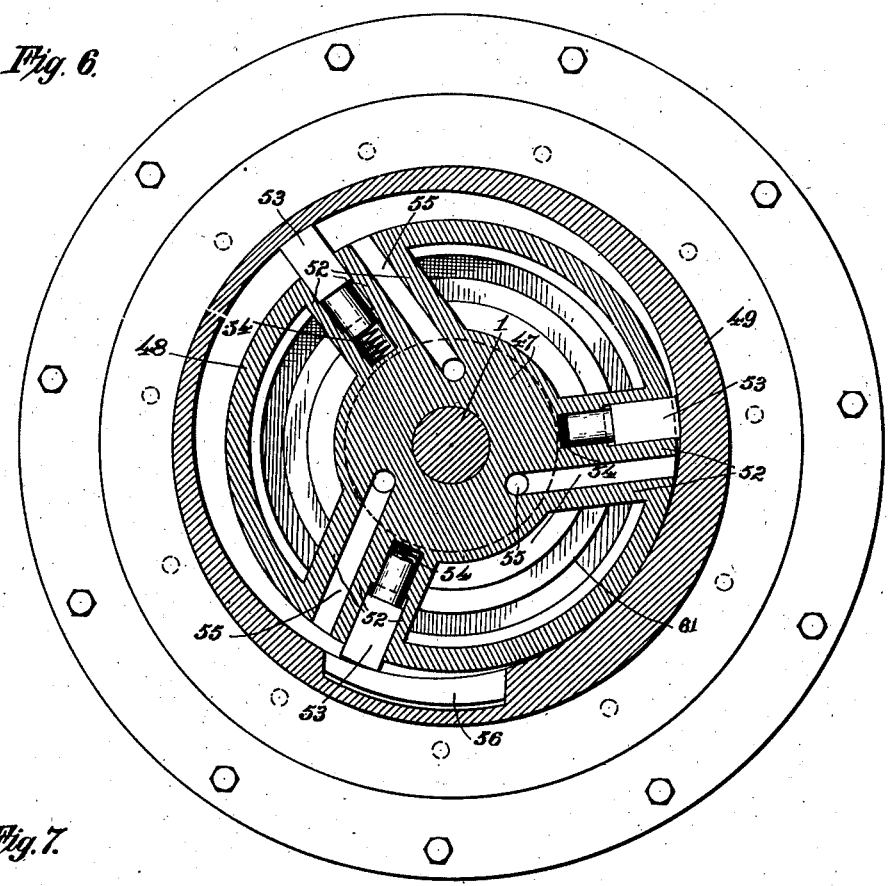
Figure 6 is a view similar to Figure 2 taken on the plane indicated by line 6—6 of Figure 1 and looking in the direction indicated by the arrow, parts being seen in elevation.

In the actual operation of the apparatus disclosed and claimed in my above-identified co-pending application, while it is true that the transmission of power at different speed ratios is capable of unlimited variation from quiescence to maximum speed, it is found that the valve controlling the flow of oil or other hydraulic medium requires to be moved to a considerable distance across the ports controlling such flow before a sufficient friction is set up to cause the hydraulic medium to transmit power from the rotor to its housing or to transmit braking action from the stationary housing to the reverse transmission rotor. It has been found that this is due largely to the circumferential area allowed for free flow of the hydraulic medium, which area must be reduced to a very considerable extent to achieve the requisite power transmission, and, therefore, the amount of active control movement of the valve, that is to say movement which expresses a variation in the ratio of power transmission, is comparatively short so that though a great nicety of control is effected and unlimited degree in power transmission is afforded, all of this is accomplished in such a short extent of motion of the valve that a considerable amount of waste motion of the valve occurs in the operation of the parts of the invention of my said co-pending application, and the movement that is directly controlling must be carried out with a greater degree of precision than would be otherwise required if the valve movement afforded responsiveness throughout its entire travel. The present invention overcomes this difficulty and provides for a valve stroke which is effective in power transmission variation at substantially all places throughout the stroke.

A distinguishing characteristic between the present improved power transmission apparatus and the structure of my above-mentioned co-pending application is the fact that in the said co-pending application the parts are arranged to allow an inter-circulation between one arcuate chamber that in operation is diminishing and another arcuate chamber that in operation is increasing in capacity, whereas in the present structure the hydraulic medium, whether oil or other fluid, is not inter-circulated directly between the respective arcuate chambers.

Referring to the drawings by numerals, 1 indicates a power shaft which is driven from any appropriate source of power, such, for example, as the internal combustion engine of a motor vehicle, and 2 is the drive shaft actuated by power transmitted through an embodiment of the present invention from the shaft 1. The shaft 2 may be of any of the various forms utilized for delivering power to the differential gear of a motor vehicle, to the propeller of a ship, or to the parts to be driven of any apparatus in which variable transmission is desirable. The shaft 1 extends into a housing 3 which preferably encloses all of the transmission apparatus, and may be made up of separable parts rigidly connected and joined to avoid leakage when enabling access to the interior by the detachment of any required section or part. As shown, the housing 3 consists of two main sections detachably bolted together and provided with a cover 4 removably fixed to the housing. An appropriate centering rib 5 outstands from one of the sections and facilitates location of the other when being assembled. The housing 3 is, of course, susceptible of any desired variation according to the details of interior construction, and is shaped to cooperate with the contained parts, as hereinafter mentioned. The ends of the housing 3 are closed except for passageway 6 at the front end to accommodate the power shaft 1, and an opening 7 at the other end to provide for the passage of the drive shaft 2 and to accommodate a detachable cap 8 closing the opening 7 and surrounding the shaft 2.

A bearing 9 is preferably set in an annular boss 10 extending inward from the front end of the housing 3 surrounding the opening 6, the bearing 9 consisting of the usual annular bearing housing, raceway or cone surrounded thereby and ball or roller or other anti-friction bearings therebetween. The power shaft 1 extends axially lengthwise of the housing 3 to a point 11 where it substantially abuts and is axially alined with the inner end of the drive shaft 2. A bearing 12 similar in construction to the bearing 9 is seated in an annular boss 13 which extends inward from the cap 8 and surrounds and supports the shaft 2. The abutting extremities of the shafts 1 and 2 are disposed within a boxing 14 having a front end closure 15, the boxing being made up preferably of detachable sections secured together, as by bolts 16, or other detachable securing means, and seated within the boxing are bearings 17 and 18, similar to bearings 9 and 12, surrounding and supporting the respective shafts 1 and 2. The boxing 14 is provided with a boss 19 to accommodate the bearing 18, and the said boss 19 is provided with an axially outstanding collar 20 which is journaled to rotate on a bearing 21, similar to bearings 9, 12, 17, and 18. Bearing 21 is seated in the opening 7 and abuts at one face against an annular shoulder of boss 19 and at the other face against the inner face of boss 13.

The boxing 14 is fixed to an annular housing 22 which comprises the power deliverer and which surrounds and encloses the main rotor or power transmitter 23. A centering rib 24 preferably outstands axially from the housing 22 into an annular groove in the face of the outstanding flanged portion of the front end closure 15 to insure a snug joint between the two parts, and appropriate bolts or other detachable securing means 25 connect the parts to normally function as a unit while facilitating assemblage and dismantling. Preferably formed integral with and outstanding axially forwardly from the front of the housing 22 is a sleeve 26 slotted longitudinally at 27, 27, the slots being arranged diametrically opposite each other. The forward end portion of the sleeve 26 is constructed as hereinafter described to cooperate with the clutching means to at times connect with the reverse power transmission rotor, also hereinafter described. The rotor 23 consists essentially of a drum or cylindrical body preferably skeletonized for the saving of weight and having a forwardly extending hub 29 surrounding the shaft 1 and preferably fixed to rotate therewith, as by a removable key 38. The drum making up the rotor 23, while preferably skeletonized as shown in Figures 1 and 2, may be otherwise formed so long as provided with the requisite pockets and ports; but, when skeletonized as preferred, consists of a disc comprising the rear end of the drum, a forwardly extending flange 30, providing the periphery of the drum, and webs or partitions 32 connecting the peripheral portion 30 with the hub 29, the said flange or peripheral portion, webs, rear plate and hub being formed integral. Each partition or fillet 32 is provided with a pocket or recess 31 extending longitudinally of the respective fillet and thus radially or substantially radially with respect to the drum making up the rotor 23. Each pocket 31 is proportioned to receive and guide a radially reciprocated vane or piston 33. Each of the vanes 33 consists of a blade movable substantially radially within the respective pocket in a direction toward and away from shaft 1, and each has a skirt appropriately guiding the vane when in its outer position. The said skirt may be of various forms, but preferably includes a pair of inwardly-projecting, laterally-spaced fingers 35 extending into guiding sockets 34, 34, and each resiliently stressed outward by an appropriate spring 36. Each spring 36 is preferably in the form of a coil, and at one end is seated against the base of the respective socket, and at the other end against the piston or vane 33. As best seen in Figure 2, each piston blade or vane 33 is provided with a recess extending from the inner end of each of the respective fingers or projections 35 outward, and the respective spring 36 has its outer end portion extending into said recess and seated against the remaining wall of the vane or piston blade. At one side of each piston blade or vane 33, each web or partition 32 is provided with a port 37 which is longitudinal of the respective partition and substantially radial of the rotor and opening at its outer end at the outer face of the peripheral portion 30. The port 37 extends inward to within the hub 29 and then extends longitudinally of the hub toward the forward end thereof, as shown in dotted lines in Figure 1, terminating just short of the forward end of said hub. The number of vanes 33 and ports 37 may, of course, be varied, but I find three quite efficient. The several ports 37 extend parallel to each other along the hub 29 and in the same transverse planes of the hub a radially outwardly extending port or outlet opening 39 communicates through the wall of the hub with each of the respective ports 37. Each of the outlet ports or openings 39, as best seen in Figure 1a, is a slit-like opening and preferably is wedge-shaped in cross section, having the larger end toward the forward end of the hub and tapering rearwardly or toward the rotor 23. Two of the outlet openings 39 are indicated in dotted lines in Figure 1.

The power deliverer 22 consists of a rotatively mounted housing enclosing the rotor 23, as seen in Figures 1, 2, and 3, and arranged eccentric thereto to leave an arcuate space 40 outward of the rotor 23 divided into arcuate chambers by the pistons 33. The housing making up the power deliverer 22 consists of an annular drum 41 and a radial web or flange outstanding from the sleeve 26 to and formed integral with the drum. The drum 41 at its rear end is provided with an outstanding flange or radial portion 42 abutting against the plate 15 and connected thereto as heretofore described. The drum 41 is provided with an intake opening 43 at one place of a length less than the distance between two of the pistons 33, and an impeller is provided for injecting the hydraulic agent, whether oil or other fluid, through the opening 43 into the space between the drum 41 and the peripheral portion 30 of the rotor 23. The rotor 23 has its peripheral portion 30 so located with respect to the inner periphery of the drum 41 as to provide a substantially hermetic seal at one place while leaving the crescent-shaped opening between the rotor and the power deliverer throughout the balance of the two structures, whereby, when the rotor is revolving, each advancing piston blade or vane 33 tends to crowd or compress the hydraulic agent within the arcuate chamber immediately in advance of the particular piston against the wall of the drum 41 to a condition connecting that wall with the peripheral portion 30 for transmitting power from the latter to the former; and, unless the hydraulic agent is allowed to escape through the respective port 37 communicating with the given peripheral chamber, power will thus be transmitted. On the other hand, when the fluid is free to flow through the respective port 37 and through the corresponding outlets 39, the rotor 23 is permitted to rotate or play freely within the power deliverer 22 without transmitting power thereto.

The impeller for delivering the hydraulic agent through the opening 43 into the space between the rotor 23 and the power deliverer 22 consists preferably of a surrounding, drum-like shell or casing 44 carried by the flange 42 encircling the drum 41, and having its end abutting against the face of the flange 42, as clearly seen in Figure 1, so that an enclosed, annular space is provided between the shell or casing 44 and the drum 41. Impeller-like blades 45 are carried by the shell or casing 44 and extend to the drum 41, and are arranged in spiral relation to the drum, as seen in Figure 1, so that, when the power deliverer rotates and the shell or casing 44 is thus rotated with its impeller blades, fluid in the lower portion of the housing 3 will be impelled by the blade 45 against the flange 42 and along the flange to and through the opening 43. A portion of the space surrounded by the shell or casing 44 is preferably closed off by a plate or sheet 46 extending along the shell or casing 44 from the trailing end of the opening 43 to a place in advance of the leading end of said opening, so that the thus impelled fluid will not have opportunity to escape laterally from the shell or casing 44 and will be caused to flow with some substantial velocity into the space between the rotor 23 and the power deliverer 22.

Surrounding the shaft 1, free to rotate thereon, forward of and abutting against the hub 29, is a hub 47, similar to hub 29, which forms part of the reverse power transmission rotor 48. The rotor 48 is seen in axial section in Figure 1, in transverse, axial section in Figure 6, and in side elevation in Figure 8. This rotor 48 consists essentially of a structure practically identical with that of the rotor 23, but differs therefrom in being arranged in a surrounding housing 49 made up largely of a part of the housing 3 and, therefore, rigid and incapable of relative movement. The balance of the housing 49 not a necessary part of the housing 3 consists of an integral flange 50 at one side of the rotor 48, and an annular plate 51 at the other side thereof detachably fixed to and within the housing 3. The rotor 48 is a drum-like enlargement at the forward end of the hub 47 and is preferably skeletonized as described with respect to the rotor 23 with a peripheral portion forming the drum of the rotor and with fillets or partitions 52 connecting the hub 47 with said peripheral part, there being preferably three of such partitions, but, of course, a larger number may be employed if desired. Each partition 52 is provided with pockets and recesses as described with respect to the partitions 32 receiving and guiding piston blades or vanes 53 urged outwardly by coiled springs 54. Each partition 52 is also provided with a port 55 opening outward into the chamber between the rotor 48 and the housing 49, and extending inward to the hub 47 and along the hub toward the rear end thereof to a point near such rear end as seen in full lines in Figure 1 and in dotted lines in Figure 8. The housing 49 is provided with an intake opening 56 leading from a lower point in the housing 3 to enable the rotor 48 to pick up the requisite oil or other hydraulic medium for functioning as hereinafter explained. Each port 55 is provided along its length in the hub 47 with a lateral outlet opening 57 seen in elevation in Figure 1 and in plan in Figures 1a and 10. Each outlet opening 57 of each port 55 is identical with each outlet opening 39 of each port 37 except that each outlet opening 57 tapers in a forward direction while each outlet opening 39 tapers in a rearward direction. In other words, each of the outlet openings 39 and 57 tapers in the direction toward the respective rotor.

The hub 47 is provided with a peripheral, cylindrical bearing portion 58 proportioned and located to receive and serve as a bearing for the forward end portion of the sleeve 26, so that said sleeve is free to rotate on the bearing 58. The forward end portion of sleeve 26 outward of the bearing 58, that is at its outer surface, is provided with clutch teeth 59 proportioned to register with corresponding clutch teeth 60 carried by the hub 47 just in rear of the rotor 48. A clutch ring 61 having an appropriate yoke-receiving groove 62 is slidingly mounted on the sleeve 26, and is provided with radially inwardly-extending longitudinal clutch teeth 63 registering with and riding in the grooves between the clutch teeth 59, when the sleeve is in the uncoupled or unclutched position. The clutch ring 61 is proportioned to slide onto that part of hub 47 having the teeth 60, so that the teeth 63 may enter the grooves between the teeth 60 and afford a clutching interlock between the teeth 60 and 63, while portions of the teeth 63 remain interlocked between the teeth 59. Thus, the sleeve 26 may be clutched to the rotor 48 or unclutched therefrom by merely sliding the ring 61 over onto the hub portion having the teeth 60, or sliding the ring back so that it is wholly on the sleeve 26. It is preferable to have the teeth 63 of different lengths at different places to avoid unnecessary clashing sounds when the clutch ring is moved to the clutching position. It should also be obvious that where silencing of the clutch action is desired, the synchronizer employed for that purpose as seen in my above-identified co-pending application may be utilized, or any other appropriate silencer may be employed.

The sleeve 26, as is plainly seen in Figure 1, is of substantially larger internal diameter than the diameter of the hubs 29 and 47, and a sleeve valve 64 is slidingly mounted on the hubs 29 and 47 within the sleeve 26. The valve 64 consists merely of a slidingly mounted sleeve of a length equal to slightly less than the distance between the set of port outlets 57 of hub 47 and the set of port outlets 39 of hub 29, and, in operation, it is only necessary to shift the sleeve valve 64 across the required port outlets 39 or 57 to control the circulation of hydraulic medium within the respective rotor 23 or 48. To accomplish the required sliding action, an operating ring 65 having a yoke-receiving groove 66 is mounted on the sleeve 26 and is engaged by an actuating yoke 67. The yoke 67 may, of course, be shifted in any manner preferred otherwise than by the details herein disclosed, but, by preference, I utilize substantially the same structural features for shifting the ring 65 as heretofore employed in the structure shown in my co-pending application for shifting the corresponding ring. As a matter of convenience of construction and assemblage, the ring 65 is connected to the sleeve valve 64 by detachable pins 69, one extending through each of the slots 27. Each of these pins consists preferably of a machine screw threaded into the sleeve 64 and having a head seated against the sleeve valve and of a length sufficient to extend through the respective slot 27 and into the ring 65. The threaded or screw portion of the connecting pin is preferably shorter than the thickness of the sleeve valve 64 so that there is no danger or likelihood of the inner end of such screw portion contacting with or causing any friction against either of the hubs 29 or 47. The clutch ring 61 has its groove 62 engaged by a yoke 70 preferably actuated by mechanism the same as disclosed in my above-identified co-pending application for shifting the corresponding clutch ring.

If the sleeve valve 64 were left subject to unbalanced pressure, there is some likelihood that at times the valve would operate with some difficulty from "sticking" or resisting longitudinal thrust. To avoid this possibility, I provide the free end portion of hub 29 with annular grooves 71, preferably one for each of the ports 37, and a communicating passageway 72 is provided for each port 37 to one of the respective grooves 71, so that whatever pressure is developed at any time in the chambers between the pistons of rotor 23 is equalized within the sleeve valve 64, and likewise the rear end portion of hub 47 is provided with three annular grooves and one of the ports 55 is formed with an opening 74 for a corresponding groove 73, so that the three grooves are supplied with fluid from the three ports of rotor 48, and equalization of pressure within sleeve valve 64 with the pressure developed between the pistons of rotor 48 is thus assured.

The yoke 67 has a base 68 which is detachably carried by an actuating plate or slide 97. The yoke 67 may be operated by any of numerous well known instrumentalities, one form of which is seen in detail in Figs. 1, 5, and 7, wherein the base 68 is shown as bolted or otherwise appropriately detachably fixed to a slide 97 having a toothed rack 76 meshing with the teeth of a segmental gear 77. The gear 77 is fixed to an operating shaft 78 which extends to the exterior of the housing 3 and is there engaged by any appropriate operating lever or handle 79. The handle 79 may be connected to any desired control or actuator, not shown. The shifting of the valve 64 longitudinally is thus accomplished by the movement of the lever 79 and its connected parts, whereby the valve may be moved from a completely seated position closing the port outlets 39 to a completely seated position closing the port outlets 57.

The parts are so proportioned that the valve may assume a neutral position, as seen in Figure 1, where all the ports are entirely open, so that the shaft 1 may be revolving, and, of course, the power transmitter or rotor 23 revolving without delivering any power in either direction to the shaft 2. From such neutral position, the valve 64 may be moved in either direction, according to the desired direction of rotation of the shaft 2. If the operator wishes the shaft 2 to move in the same direction as shaft 1, which may be considered the forward driving direction, it is only necessary for him to shift the lever 79 in the direction for causing the valve 64 to move rearwardly and to cut off more or less of the flow through the port outlets 39. As soon as this is done, the resistance set up by the fluid that can not escape transmits power from the rotor 23 to the housing 22, and thence through boxing 14 to the shaft 2 through the differential gears within the boxing and hereinafter to be described. Likewise, when the operator desires the shaft 2 to move in a reverse direction to the direction of rotation of shaft 1, he shifts the valve 64 from the neutral position forward to close the port outlets 57 to a greater or less extent. In so doing, of course, the port outlets 39 are left fully open, which leaves the rotor 23 free to play within the housing 22 without transmitting power thereto. Of course, before shifting the valve 64 to the position for closing or partly closing the port outlets 57, the operator must see that sleeve 26 is clutched to the rotor 48. As the valve begins to shut off the discharge through the port outlets 57, a braking or retarding action is caused against the rotor 48 incident to the impact of the fluid against the non-moving walls of the drum 49.

It will be readily understood by those skilled in the art of transmission gearing that a differential gear being arranged in the boxing 14, as hereinafter described, for transmitting motion from shaft 1 to shaft 2, the housing 22 will be revolving whenever the shaft 1 is in motion, even though the valve 64 is in the neutral or idling position and no power is being transmitted from rotor 23 to the housing 22. It follows, therefore, that when the sleeve 26 and rotor 48 are interlocked or clutched together, and the rotor 48 is retarded in its rotation, it serves as a brake to proportionally slow down the rotation of the housing 22 and the boxing 14 while the shaft 1 continues to rotate at normal or predetermined speed, and therefore, the gearing contained within the boxing 14 will transmit to the shaft 2 motion in a reverse direction and at a rate proportional to and less than the speed of shaft 1 so long as the housing 22 continues to turn, depending on the gear ratio of the gears in boxing 14 and the extent to which the speed of the housing 22 has slowed down. Reverse motion may, therefore, be readily imparted to the shaft 2 by the mere shifting of the valve 64 to position for closing or partly closing the port outlets 57, the speed of the reverse motion being varied and controlled by the extent to which the discharge through said port outlets 57 is cut off.

The gearing in the boxing 14 may be any well known differential gear of the general type commonly employed in rear axle construction of motor vehicles, and may have any preferred ratio. For example, a gear 93 is fixed to or formed integral with the shaft 1 and is preferably of the beveled and silent gear type. Gear 93 meshes with corresponding rightangle gears 94, 94, journaled on an appropriate spider fixed within the boxing 14, so that the gears 94 may either travel bodily with the gear 93 or "walk" thereon. Fixed to the shaft 2 or formed integral therewith within the boxing 14 is a gear 95 similar to gear 93, and also meshing with the gears 94. Three gears 94 have been indicated in the accompanying drawings, and are preferred for average construction, but a greater or less number of gears 94 may be used when and if desired. The spider for the gears 94 terminates inward in a ring 96, which is of a width sufficient to enclose a double bearing 80, one each for the terminals of the shafts 1 and 2. It will thus be obvious that when the shaft 1 is rotating and the rotor 23 is transmitting full forward driving speed, that is with the valve 64 completely closing the port outlets 39, the gears 94 will be carried with the gear 93 and will carry with them the gear 95, so that the shaft 2 is rotated in the forward direction at the same speed as the shaft 1. Now if the valve 64 be retracted somewhat, that is moved forwardly, and a certain amount of discharge is thereby permitted through the port outlets 39, there will be a proportional relative movement of the rotor 23 with respect to the housing 22 and a corresponding lag in the motion of the housing 22 which will result in a proportional slowing down of the rotation of the shaft 2, the gears 94 walking along the respective gears 93 and 95 to compensate for this differential. The result is not only reduction in speed, but an increase in the force or power with which the shaft 2 is driven relative to the power of shaft 1. Accordingly, an infinite number of variations in speed and power are available for transmission from zero to maximum from shaft 1 to shaft 2, all accomplished by the mere shifting of the valve 64 and the proportional variation in the discharge permitted through the port outlets 39. The tapering, slit-like form and comparatively diminutive size of the port outlets 39 enables the cutting off of the discharge from the ports 37 with a refinement of precision that assures a wide range and smoothness of variation in the speed differential.

For purposes of comparison, and to better aid ready appreciation of the principles of operation, the rotor 23 functions somewhat as a clutch with respect to housing 22, but with available ready slippage without objectionable friction or injury, and likewise the rotor 48 functions substantially as a brake with respect to the fixed drum 49 with ready slippage and without objectionable friction or injury.

Figure 7:
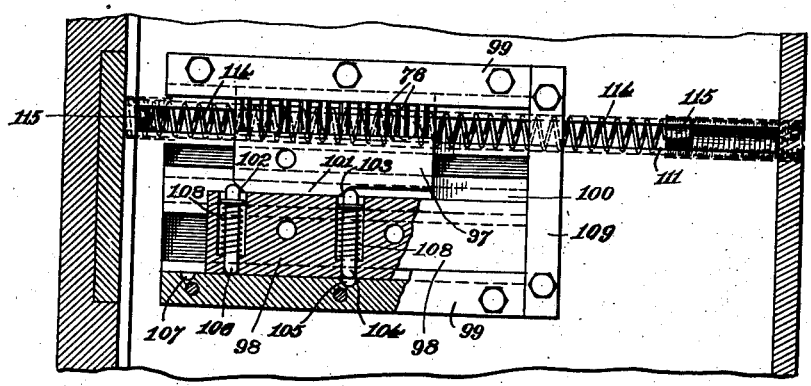
Figure 7 is a horizontal section taken on the plane indicated by line 7—7 of Figure 5 and looking upward, parts being seen in inverted plan.

Any appropriate means may be provided for shifting the yoke 70 for moving the ring 61 to and from the clutching position and thereby connecting and disconnecting the rotor 48 with respect to sleeve 26; but it is quite desirable for convenience and efficiency of operation to provide means whereby parts which shift the ring 65 will operate devices for actuating the ring 61 correspondingly, and, to this end, a slide 97, as best seen in Figures 5 and 7, preferably is constructed to cooperate with and to actuate the yoke 67. Accordingly, a slide 98 is mounted in the cover 4 in contact with the slide 97 to at times move therewith, and to the slide 98 is fixed the yoke 70. Slideways 99, 99 and 100 are detachably carried by the cover 4, and the slides 97 and 98 are provided with appropriate splines or ribs slidingly mounted in grooves in said slideways to insure accuracy and efficiency in the functioning of the said slides. A lateral extension 101 (see Figure 7) projects from one edge of slide 97 into contact with the adjacent edge of slide 98 and terminates in a beveled or cammed end 102 at one end and a corresponding beveled or cammed end 103 at the other, located, when the parts are at rest, that is when the valve 64 is in its neutral position, to have the cam 103 contact with the rounded projecting end portion of an appropriate plunger 104 reciprocally mounted within and extending through the slide 98 in position to have its opposite end engage a recess 105 in the corresponding guideway 99. Likewise, the cam 102 contacts with the rounded projecting end portion of a plunger 106 similar in construction and arrangement to plunger 104 and adapted at times to enter a recess 107 in the last-named guideway 99. Each plunger 104 and 106 is stressed by an appropriate spring 108 toward the slide 97. Thus, when the parts are in the position seen in Figure 7, that is with the valve 64 in its neutral position, and the lever 79 is operated to shift the slide 97 in a direction to cause the valve 64 to move over the port outlets 39 so as to begin to slow down discharge through the ports 37, the cam 103 depresses the plunger 104 into recess 105, whereby the slide 98 is locked against possible, accidental, forward movement, and the flat edge face of the projection 101 rides across the rounded end of the plunger 104 as the slide 97 is moving to shift the valve 64 further over the port outlets 39. In fact, this relation of the slide 97 with respect to the plunger 104 will continue as long as the movements of the slide 97 are for locating the valve 64 with respect to the rotor 23; but whenever the operator moves the slide 97 away from the position of control of the port outlets 39, the cam 103 will be moved past the plunger 104 and the plunger will thereby be allowed, under the stress of spring 108, to move to the position seen in Figure 7, which releases the slide 98 and leaves it free to shift along with the guide 97, providing that the slide is to be moved in a direction away from the plunger 104 and not toward it. Thus, when the operator desires reverse motion in the shaft 2, and accordingly shifts slide 97 forwardly so as to move the valve 64 into position for beginning to shut off the flow through the port outlets 57 of rotor 48, such movement of the slide 97 will be accompanied by a corresponding movement of slide 98 incident to the fact that the cam 102 engages the projecting rounded portion of the plunger 106. This movement of slide 98 with the slide 97 will continue until the ring 61 is in clutch with the teeth 60, and this clutched condition is completed at or about the time when the plunger 106 reaches alinement with the depression 107, whereupon the cam 102 depresses the plunger 106 into the recess 107 and thereby locks the slide 98 against further movement while the slide 97 is free to continue its forward movement and to carry with it the ring 65 and the valve 64. The straight edge portion of the projection 101 of slide 97 rides over the rounded end portion of plunger 106 during this further movement of slide 97, and any desired shifting of slide 97 toward increased or decreased reverse motion of shaft 2 may be accomplished while the plunger 106 is thus held depressed in the recess 107 and the slide 98 thereby locked against movement; but as soon as the slide 97 is returned incident to the bringing of the valve 64 back to neutral, the cam 102 will in such return motion pass the plunger 106 and allow it to spring out of recess 107, and at the same time the cam 103 will engage the projecting end portion of the plunger 104 and thereby cause the slide 98 to move with the slide 97 until the plunger 104 has reached alinement with the recess 105. The slide 98 is substantially greater in length than the length of the slide 97 and is of sufficient length beyond the plunger 104 for causing the rear end of the slide, when the plunger 104 reaches alinement with the recess 105, to abut against a detachable portion 109 of cover 4 and prevent any further rearward sliding movement of slide 98. After the reverse motion of shaft 2 is completed, and the operator desires to drive the shaft 2 in the forward direction, a return of the slide 97 is all that is required to accomplish this result. With the return movement, the slide 98 is restored to its normal, neutral position as just stated, and the valve 64 may then be shifted for causing the power transmitter or rotor 23 to impart driving force to the housing 22.

Just above the planes of the slides 97 and 98, the cover plate 4 is formed with a tubular bore 110 which may be formed in the wall of the material of plate 4 or constructed as a separate part, as desired. The lower part of the bore 110 is opened by a longitudinal slot 111 and a pin 112 extends from within the bore 110 through the slot 111 into a recess 113 in the slide 97. Coiled springs 114, 114 are arranged in the bore 110, one on each side of the upstanding portion of pin 112 and arranged to engage the pin, the opposite end of each spring being seated against a terminal portion of the bore 110, and the springs being tensioned to preserve the pin 112 at that location in the length of the slot 111 represented by the position of the slide 97 when the valve 64 is in the neutral location. Thus, any movement of slide 97 must be against the pressure of one or the other of the springs 114, and the said springs are preferably tensioned to return the slide to the neutral position when the parts are released, unless the operating handle 79 is held against return movement, as by the engagement of some appropriate form of detent. A plug 115 is preferably threaded into each end portion of the bore 110 to form a seat for the respective spring 114, so that the plug can be threaded along the bore as desired for increasing or decreasing the tension of the spring 114 and thus insuring effective balance of the two springs and the proper functioning thereof to center the pin 112 with the valve 64 in the neutral position. To insure against over-thrust of pin 112 and its slide 97 from any slightly unbalanced tensioning of springs 114 in either direction from the centered or neutral position, the inner end of each spring 114 abuts against spaced fillets 129 located in the length of bore 110 at approximately the neutral position of the pin and between which the pin is free to move.

It should be understood that in the normal operation of the apparatus, when the shaft 1 is idling, that is rotating without delivering power to shaft 2, the rotor 23 will be revolving in a forward direction at full speed but playing freely in the freely circulating fluid, and at the same time the gears 94 will be walking on the temporarily stationary gear 95 incident to the action of the gear 93 on said gears 94. This walking movement will be at a speed according to the ratio between the gear 93 and gears 94. A ratio of two to one is appropriate, though other ratios may be utilized when and as preferred, and if the two to one ratio is employed, then when the shaft 1 is idling, the housing 22 will be rotating in the forward direction at half the speed of shaft 1. The action of the rotor 48 is simply to slow down or stop such motion of the housing 22, and when such motion is completely stopped, the gear 93 will directly rotate the temporary, stationarily mounted gears 94 and will impart proportional rotation to the shaft 2, that is the shaft 2 will be rotated in the reverse direction at the speed of shaft 1.

While the rotating elements or rotors above described are properly referred to as hydraulic, they are intended to function with any appropriate fluid preferably possessing the least capacity for compression, such as lubricating oil or the like.

The filling and drainage of the housing 3 may be accomplished in any preferred manner from time to time, and any well known provision for the introduction and removal of the oil or other hydraulic medium may be provided, such as the filler opening and drain opening customarily provided for motor vehicle transmission housings, which openings are ordinarily normally retained closed by threaded plugs. Obviously, the drain out opening will be preferable at the lowermost point of the housing, and the filler opening at slightly above the normal liquid level to be maintained within the housing. One acceptable liquid level for housing 3 is substantially on a plane just below the lowest point of the bearing for shafts 1 and 2.

As the fluid is distributed throughout all the moving parts within housing 3, appropriate drain backs are preferably provided wherever required to insure avoidance of undesirable accumulations in upper portions; and, to that end, a port 116 leads from in advance of bearing 9, and a port 117 leads from the rear of bearing 12 to lower portions of housing 3 for drain back purposes. Also, it will be noted that a bearing 118 is provided on shaft 1 for the forward end of rotor 48 and the rotor is supported on said bearing by an annular boss 119 outstanding forwardly from rotor 48 and snugly surrounding the outer bearing ring of bearing 118.

The action of the impeller shell or casing 44 is to maintain a constant stream of hydraulic medium discharging into or tending to discharge into the opening 43 at all times during rotation of power deliverer 22. Of course, at any time when the power deliverer is held either retarded or inactive, the hydraulic medium is not required for rotor 23, and at all other times the hydraulic medium is supplied in sufficient quantities for effective operation. The return of such medium through the ports 37 and the port outlets 39 provides the supply for the impeller in the course of its revolution. Naturally, when the port outlets 39 are completely closed, the circulation will be discontinued and the rotor 23 will not require a supply of fluid other than that locked within the arcuate chambers not including that chamber having the opening 43. Yet during such revolution, a supply will be at hand through opening 43 by the action of the impeller shell or casing 44 whether required or not to insure supplementing any possible losses in case of any slight slippage.

Impeller 44 is preferably detachably fixed to flange 42 of the power deliverer 22 as by being fastened by screws or like fasteners 46'.

It will be apparent from the foregoing that the present inventive concept is inclusive of two inventions, one relating to the structural features that are especially efficient in the hydraulic transmission of power, and the other relating to a mode, process, or art of transmitting and controlling distribution of power expressed as motion, which art is susceptible of being utilized by any of numerous, different forms of apparatus. The foregoing description will serve as one illustrative application of this improved art.

To insure freedom from jerks, shocks, or sudden or otherwise objectionable changes, and to invariably provide smoothness in the transmission of power hydraulically, and in the change of the ratio of velocity of such transmission, I have found that when the pressure on the hydraulic medium that serves to transit power is to be released or its release is to be varied for discontinuing transmission or varying the speed of transmission, a stream of such medium having a substantial bulk or body or relatively large cross section is objectionable, and refinement and smoothness of control can better be obtained by causing the stream to be in the form of a relatively thin sheet. The sheet should be elongated to the required degree to afford the release and variation of pressure as required. To lessen the release of the pressure, the stream should be narrowed preferably in the direction of its width. Thus, the slit-like openings 39 serve well to exemplify the character of pressure-releasing stream preferred. Openings 39 may be keyhole shape or otherwise varied from the specific form shown in Figure 1a, but are preferably enlarged at one end or toward one end for permitting a comparatively large volume of hydraulic medium to be released when the slit-like opening is fully open to completely relax the pressure on said medium. But when otherwise than fully open, the slit should be shaped to insure a relatively thin, wide stream flowing therethrough which can be reduced in cross section or volume escaping by shortening the width of the stream. Of course, the slit need not be in a straight line, and the sheet form of the stream may be otherwise than a flat or straight sheet, and also it is not a controlling necessity that the port outlet be the place where the slit produces the comparatively thin, wide sheet of outflowing hydraulic medium. The thin, sheetlike stream may be produced at any place in the course of the outflow of such medium, but it is preferable to have the control means, that is some form of valve as illustrated in valve 64, so located with respect to the place where the thin sheet of outflowing hydraulic medium occurs as to control such outflow at that place.

What is claimed is:

1. In power transmission apparatus, the combination of a power deliverer, a power transmitter, means for compressing hydraulic medium therebetween, a hub outstanding from the power transmitter and having a port leading from the compression area of the hydraulic medium, the said port having a port outlet, a sleeve valve surrounding the hub and slidable thereon for closing and opening said port outlet, and means for equalizing the pressure between the inner surface of the sleeve and the compression area of the hydraulic medium.

2. The combination as claimed in claim 1 wherein the pressure equalizing means includes a circumferential groove surrounding the hub within the sleeve with which groove the port communicates.

3. In power transmission apparatus, the combination, with a drive shaft and a power shaft for actuating the drive shaft, of a rotor connected to rotate with the power shaft, a housing surrounding the rotor and connected to deliver power to the drive shaft, the housing and rotor being arranged with an arcuate space therebetween, hydraulic medium compressing means movable between the rotor and the housing for being reciprocated by contact with the curved surface of a wall bounding the arcuate space, a hub outstanding axially from the rotor, the rotor and hub having a port leading from the area of compressed hydraulic medium along the hub, and having a port outlet through the hub, means movable across the port outlet for closing the same, said housing being formed with an opening leading into the space between the housing and rotor, and an impeller surrounding the housing and directing and impelling the hydraulic medium through said opening into the space between the housing and the rotor.

4. In power transmission apparatus, the combination, with a drive shaft and a power shaft for actuating the drive shaft, of a rotor connected to rotate with the power shaft, a housing surrounding the rotor and connected to deliver power to the drive shaft, the housing and rotor being arranged with an arcuate space therebetween, hydraulic medium compressing means movable between the rotor and the housing for being reciprocated by contact with the curved surface of a wall bounding the arcuate space, a hub outstanding axially from the rotor, the rotor and hub having a port leading from the area of compressed hydraulic medium along the hub, and having a port outlet through the hub, means movable across the port outlet for closing the same, and a second rotor mounted to rotate freely and independently of the first rotor and having a hub portion extending therefrom toward the hub portion of the first rotor, a second housing surrounding the second rotor; the second housing and second rotor being arranged with an arcuate space therebetween, a second hydraulic medium compressing means movable between the second rotor and the housing for arresting movement between the second rotor and the second housing, said second rotor having a passage leading from the the second area of compressed hydraulic medium through said hub and having an outlet port extending through said hub, valve means common to both of said hubs and movable in one direction to control one of said outlet ports and movable in another direction to control the other outlet port, and means for coupling the second mentioned rotor with the first mentioned housing.

5. In power transmission apparatus, the combination, with a drive shaft and a power shaft for actuating the drive shaft, of a rotor connected to rotate with the power shaft, a housing surrounding the rotor and connected to deliver power to the drive shaft, the housing and rotor being arranged with an arcuate space therebetween, hydraulic medium compressing means movable between the rotor and the housing for being reciprocated by contact with the curved surface of a wall bounding the arcuate space, a hub outstanding axially from the rotor, the rotor and hub having a port leading from the area of compressed hydraulic medium along the hub, and having a port outlet through the hub, means movable across the port outlet for closing the same, and a second rotor mounted to rotate independently of the first rotor and having a hub portion extending therefrom toward the hub portions of the first rotor, a second housing surrounding the second rotor, the second housing and second rotor being arranged with an arcuate space therebetween, a second hydraulic medium compressing means movable between the second rotor and the second housing for arresting movement of the second rotor, said second rotor having a passage leading from the second area of compressed hydraulic medium through said hub and having an outlet port extending through said hub, valve means common to both of said hubs and movable in one direction to control one of said outlet ports and movable in another direction to control the other outlet port, and means for operably connecting said second rotor with the drive shaft.

6. In a power transmission apparatus, the combination, with a power drive shaft and a driven shaft for receiving power therefrom, of a plurality of rotors, one connected to rotate with the power shaft and the other normally free to rotate independently thereof, a housing surrounding the connected rotor and spaced to provide a spacing for hydraulic medium, means for exerting pressure on hydraulic medium in said spacing for transmitting motion from the connected rotor to its housing, a second housing for the freely rotatable rotor and spaced therefrom to provide a spacing for hydraulic medium, means carried by the last named rotor for exerting pressure on the hydraulic medium for retarding and arresting relative rotation between the second housing and said last named rotor, each rotor having a hub extending axially toward the other rotor and each having a passage leading from the space between the rotor and its housing to a point adjacent the extremity of the hub and formed with an outlet port extending through to the exterior of said hub, valve means movable in one direction to control one outlet port and movable in another direction to control the outlet port in the other hub, and means for connecting the freely rotatable rotor with the first-mentioned housing.

7. The combination as expressed in claim 6, wherein the last named means includes a reverse gear unit for driving said driven shaft in a reverse direction.

8. The combination as expressed in claim 6, wherein the valve means comprises a sleeve surrounding said hubs and slidable thereon in one direction to control the port in one of the hubs and in an opposite direction to control the port in the other hub.

9. In a transmission apparatus of the class described, a drive shaft, a driven shaft, a rotor, operable by said drive shaft, an eccentric housing surrounding said rotor having an inlet port and arranged to be coupled to said driven shaft for rotation therewith, means on said rotor for establishing a hydraulic driving relation between the rotor and housing when a hydraulic medium is introduced therein through said inlet port, a casing surrounding said housing and having an opening disposed in an axial direction with respect to said housing, and an impeller comprising a spiral conveying vane disposed in said opening for impelling a hydraulic medium axially of the casing toward said port upon rotation of the housing in a hydraulic medium.

10. In a transmission apparatus of the class described, a drive shaft, a driven shaft, a rotor, operable by said drive shaft, an eccentric housing surrounding said rotor having an inlet port and arranged to be coupled to said driven shaft for rotation therewith, means on said rotor for establishing a hydraulic driving relation between the rotor and housing when a hydraulic medium is introduced therein through said inlet port, a casing surrounding said housing and having an opening disposed in an axial direction with respect to said housing, an impeller comprising a spiral conveying vane disposed in said opening for impelling a hydraulic medium axially of the casing toward said port upon rotation of the housing in a hydraulic medium, said rotor being formed with a discharge port leading from the interior of the housing to an outlet in the exterior of the rotor, and shiftable valve means for variably controlling said outlet.

11. In a transmission apparatus of the class described, a drive shaft, a driven shaft, a rotor, operable by said drive shaft, an eccentric housing surrounding said rotor having an inlet port and arranged to be coupled to said driven shaft for rotation therewith, means on said rotor for establishing a hydraulic driving relation between the rotor and housing when a hydraulic medium is introduced therein through said inlet port, a casing surrounding said housing and having an opening disposed in an axial direction with respect to said housing, an impeller comprising a spiral conveying vane disposed in said opening for impelling a hydraulic medium axially of the casing toward said port upon rotation of the housing in a hydraulic medium, said rotor being formed with a discharge port leading from the interior of the housing to an outlet in the exterior of the rotor, shiftable valve means for variably controlling said outlet, and a housing surrounding said casing and said impeller for maintaining a hydraulic medium liquid level above the opening in said casing to supply the hydraulic medium to said spiral vane.

JOHN W. HAMBLIN.